United States Patent
Bucknell et al.

(10) Patent No.: US 9,020,546 B2
(45) Date of Patent: Apr. 28, 2015

(54) INTERFERENCE MANAGEMENT IN WIRELESS COMMUNICATION NETWORKS

(71) Applicant: Fujitsu Limited, Kawasaki-shi, Kanagawa (JP)

(72) Inventors: Paul Bucknell, Brighton (GB); Hind Chebbo, Uxbridge Middlesex (GB); Jumoke Ogunbekun, Middlesex (GB); Milos Tesanovic, Middlesex (GB)

(73) Assignee: Fujitsu Limited, Kawasaki (JP)

( * ) Notice: Subject to any disclaimer, the term of this patent is extended or adjusted under 35 U.S.C. 154(b) by 223 days.

(21) Appl. No.: 13/690,005

(22) Filed: Nov. 30, 2012

(65) Prior Publication Data

US 2013/0150106 A1    Jun. 13, 2013

(30) Foreign Application Priority Data

Dec. 9, 2011    (EP) .................................... 11192891

(51) Int. Cl.
*H04B 15/00*    (2006.01)
*H04W 16/14*    (2009.01)
(Continued)

(52) U.S. Cl.
CPC .............. *H04W 16/14* (2013.01); *H04W 4/005* (2013.01); *H04W 72/1215* (2013.01); *H04W 72/082* (2013.01); *H04J 11/0023* (2013.01)

(58) Field of Classification Search
CPC ...... H04B 1/1027; H04B 15/00; H04B 1/525; H04W 16/14; H04W 28/04; H04L 1/0026; H04L 1/0009; H04L 1/0003
USPC ........ 455/418–420, 422.1, 426.1, 432.1, 433, 455/501, 517, 524, 525, 63.1, 67.11, 67.13, 455/550.1, 552.1, 553.1, 560, 561
See application file for complete search history.

(56) References Cited

U.S. PATENT DOCUMENTS

| | | | |
|---|---|---|---|
| 2003/0123420 A1 | 7/2003 | Sherlock | |
| 2007/0026793 A1* | 2/2007 | Perdomo | ..................... 455/11.1 |

(Continued)

FOREIGN PATENT DOCUMENTS

| | | |
|---|---|---|
| CN | 102158959 | 8/2011 |
| EP | 1 261 141 | 11/2002 |

(Continued)

OTHER PUBLICATIONS

Communication Pursuant to Article 94(3) EPC dated Mar. 14, 2014 from the corresponding Application No. 11192891.7-1852.

(Continued)

*Primary Examiner* — Nhan Le
(74) *Attorney, Agent, or Firm* — Katten Muchin Rosenman LLP

(57) ABSTRACT

A scheme to reduce the problem of radio interference between wireless devices such as MTC devices in a multi-RAT scenario. Wireless devices are configured (S10) for interference reporting in accordance with their capabilities. Information is collected, not only on interference measurements reported by the wireless devices, but also on device signatures (S12) and transmission patterns (S14) for the purpose of attributing interference, suffered by a reporting device, to one or more offending devices (S16). One or more mitigation techniques is then applied to the offending device and/or the reporting device (S20-S24). The scheme provides an additional stability mechanism for existing interference mitigation and co-existence schemes by using device management and avoiding potential conflicts across diverse systems. Under the assumption that geographically co-located devices are all using a common service platform, the centralized algorithm permits more efficient solutions than existing interference mitigation solutions.

15 Claims, 6 Drawing Sheets

(51) Int. Cl.
*H04W 4/00* (2009.01)
*H04J 11/00* (2006.01)
*H04W 72/12* (2009.01)
*H04W 72/08* (2009.01)

(56) References Cited

U.S. PATENT DOCUMENTS

| | | |
|---|---|---|
| 2009/0203322 A1 | 8/2009 | Horn et al. |
| 2010/0087221 A1* | 4/2010 | Srinivasan et al. ............ 455/522 |
| 2010/0248736 A1 | 9/2010 | Hulkkonen et al. |
| 2012/0021689 A1 | 1/2012 | Han |

FOREIGN PATENT DOCUMENTS

| | | |
|---|---|---|
| EP | 2083594 A2 | 7/2009 |
| EP | 2 091 282 | 8/2009 |
| EP | 2083594 A3 | 4/2010 |
| WO | 2008/142529 | 11/2008 |
| WO | 2011/134136 | 11/2011 |

OTHER PUBLICATIONS

European Search Report dated Jun. 12, 2012, from corresponding European Application No. 11192891.7-2411.

3GPP TR 23.888 V1.5.0, 3rd Generation Partnership Project; Technical Specification Group Services and System Aspects; System Improvements for Machine-Type Communications; (Release 11), Oct. 19, 2011.

Dr. Mischa Dohler, et al. "M2M in Smart Grid & Smart Cities, Technologies, Standards, and Applications" Oct. 28, 2010, retrieved from http://wikienergy.cttc.es/images/2/2d/Dohler_AlonsoZarate_ISABEL2011Tutorial.pdf on May 29, 2012.

* cited by examiner

INTERFERENCE MANAGEMENT IN WIRELESS COMMUNICATION NETWORKS

FIELD OF THE INVENTION

This invention generally relates to wireless communication networks and in particular, though not exclusively, to Machine Type Communication (MTC) in such networks, where MTC is a form of data communication which involves one or more entities that do not necessarily need human interaction.

The two main standards groups involved in MTC are the $3^{rd}$ Generation Partnership Project (3GPP) and the European Telecommunications Standardization Institute (ETSI). The term MTC is essentially synonymous with Machine-to-Machine Communication (M2M) as used by ETSI. ETSI defines an M2M device as one capable of replying to a request for data contained within the device, or capable of transmitting data contained within it autonomously.

BACKGROUND OF THE INVENTION

MTC is different from current communication models as it involves new or different market scenarios. Potentially it involves very large number of communicating entities (MTC devices) with little traffic per device. Examples of such applications include: fleet management, smart metering, home automation, e-health, etc. Many different MTC devices may operate in the same location using a variety of radio access technologies on many different radio frequencies.

Studies of MTC have indicated great potential for such communications over mobile networks. The ubiquitous coverage of mobile networks is one main enabler.

However, to fully support these service requirements, it is necessary to improve efficiency in radio access networks to handle machine-type communications. Efforts have already been made in this direction, and the 3GPP Technical Report TR 23.888 "System Improvements for Machine-Type Communications", hereby incorporated by reference, summarises an agreed architectural baseline for MTC services provided by a 3GPP wireless communication system.

An important consideration in improving efficiency is the use of multiple radio frequency bands in the most efficient way to handle both short range local communications links and wide area links via cellular networks.

As the number of devices in a given geographical area increases, the problem of radio interference between devices will increase. Typically, in one geographical area there will be many devices using radio communication information both on short range (<100 m) links and using cellular wide area networks (typically >100 m).

Typical scenarios where the number of devices will be seen to be increasing includes "smart cities" where many devices are deployed in the environment for transportation, environmental monitoring, etc. using both short range and long range communications networks.

Another environment where many devices could be deployed in close proximity is in the home, where many devices use radio connections for the transfer of sensor data, health related data, personal information and general communications (WiFi and voice), etc. The expression "geographical area" is thus to be interpreted broadly. It could include, for example, a single house or office building.

There are several different scenarios where interference mitigation would be beneficial including:
(i) Interference between devices operating on the same band (e.g. the ISM band at 2.4 GHz) with either:
  the same radio access technology; or
  different radio access technologies
(ii) Interference between devices operating in different frequency bands (but still causing mutual interference caused by receiver and/or transmitter non-linearity).

The management of interference can generally take two forms:
(a) Passive interference management: this is where one device monitors for interference and operates in a way to avoid any potential problems.
(b) Active interference management: where one device can communicate to other devices information relating to interference, which can be used by other devices to avoid potential problems.

However, such management is generally confined to a single radio access network (RAN) as explained below. In the above-mentioned scenarios, there is a need to improve existing interference and co-existence schemes to avoid potential conflicts across diverse systems.

SUMMARY OF THE INVENTION

According to a first aspect of the present invention, there is provided a wireless communication system having a plurality of radio access networks and comprising:
a plurality of wireless devices each operable to perform wireless communication via at least one of the radio access networks; and
a controller arranged to receive information, including information based on interference measurements, transmitted from the wireless devices over the radio access networks; wherein
the controller includes a processor for processing said information to attribute interference, measured by a said wireless device, to one or more other said wireless devices, and for generating one or more instructions to said wireless devices for mitigating said interference.

Here, the "system" refers to the above-mentioned wireless devices, controller, and any intermediate nodes serving a particular geographical area (which may be as small as a single building, for example). Thus, the wireless devices may be in close wireless proximity to one another. Intermediate nodes, which may themselves be wireless devices, will typically include a base station. There may be several distinct geographical areas managed by the same controller, which may provide a common service platform for the plurality of radio access networks.

The expression "radio access network" (RAN) refers to a distinct network within the system. As is well known, a radio access network provides a wireless connection between wireless devices and a core network by implementing a radio access technology (RAT). In the present invention, multiple radio access networks are configured using one or more RATs. The radio access networks may serve distinct groups of wireless devices. In this way, for example, one group of wireless devices may be operable for wireless communication in accordance with a first RAT and a second group of devices may be operable in accordance with a second RAT.

Different radio access networks may be employed in combination in the transmission path between the wireless devices and the controller. For example the wireless devices may employ a first radio access network using a short-range radio access technology to transmit to a mobile station of a second radio access network, which is based on wide-area cellular wireless technology.

Examples of such technologies include ones in accordance with the IEEE standards 802.15.6 (BAN/MBAN, as one of the candidate technologies for MTC/M2M communication); other 802.15 group standards (WPAN) including 802.15.1 (Bluetooth) and 802.15.4 (Zigbee); 802.11 (Wi-Fi); 802.16 (WiMAX) as well as the ETSI/3GPP groups of standards including GSM, UMTS, LTE, LTE-A and so on.

As already mentioned there is a particular risk of interference among many physically co-located MTC devices; consequently, the wireless devices may include MTC devices. The wireless devices may also include subscriber stations which may variously be referred to as UEs, MSs (mobile stations) or SSs. The wireless devices may also include any intermediate wireless nodes between MTC devices or subscriber stations and the controller, including base stations (which includes a hub or gateway where appropriate), relay stations and peer nodes in a peer-to-peer network. That is, any of these kinds of device may make their own interference measurements and contribute to the information received by the controller.

There may be overlap between the two groups of devices; that is, the same wireless device may be capable of communicating via more than one of the radio access networks, including simultaneously. The networks do not necessarily employ different radio access technologies but may, for example, be networks which belong to different operators whilst adhering to the same technical standards. The interference may be interference either on the downlink (the wireless link to the wireless device from a hub or base station), the uplink, or both. Information obtained by the controller based on interference measurements may include information obtained by the hub or base station.

The "information, including information based on interference measurements" will normally also include information on device signatures and transmission patterns so as to assist the controller in attributing interference to specific devices. This information may include frequency and time transmission patterns, traffic type (periodic or "bursty", and packet size), and spatial signatures being used by the devices.

The information is not necessarily transmitted directly to the controller; it may be transmitted to a superordinate node in the network, such as a base station, from which it may be forwarded to the controller, either wirelessly or via a wired connection, via one or more intermediate nodes. The controller need not itself be a wireless device but may exist in a core network distinct from any of the radio access networks, or may be outside of but accessible to the core network(s). It is also referred to below as a "central unit" or "central entity" (where "central" means common to all the networks, rather than necessarily centralised in a single location). The controller may act as a common interference "broker" provided in an embodiment of the present invention for all the radio access networks.

MTC is a specific use case for an embodiment of the present invention. According to an ETSI proposal, a network remote entity management (NREM) capability provides a common service platform for all the MTC devices. Thus, when at least some of the devices are MTC devices, it is preferable that the controller be associated with the NREM. The controller is preferably at the service/application level in the system; that is, at the level of MTC services or applications which make use of information gained from the MTC devices, rather than at the network level. This allows the controller to gather information from the plurality of radio access networks, which potentially implement different RATs. The controller may be part of (or constitute) an MTC server within an M2M Service Capabilities Layer.

In one embodiment of the method, the instructions issued by the controller include instructions to those other wireless devices to which the interference is attributed. In other words, the controller instructs the interference-causing device(s) to alter their transmission in some way so as to reduce the interference experienced by the interference-measuring device.

Alternatively, or in addition, the instructions include one or more instructions to the wireless device which measured the interference. In other words, the controller instructs the interference-measuring device to alter its wireless link with a base station or hub, or any intermediate node such as a peer device in a peer-to-peer network, so as to avoid the time/frequency resources most affected by interference.

The instructions may include an instruction to a wireless device to refrain from transmitting within a defined time period and/or on a defined frequency and/or in a specific spatial direction. This may achieve an effect similar to the known ICIC/eICIC described below.

The instructions may include an instruction to a wireless device to perform wireless communication using a different radio access network. Thus, where a wireless device is capable of employing more than one radio access network, it may be controlled to switch to an alternate radio access network (probably one employing a different RAT), if this would reduce the interference in the system.

The instructions may include an instruction to a wireless device to change one or more transmission parameters of its wireless communication, such as transmission power, transmission frequency, or modulation and coding scheme, or retransmission parameters, or spatial coding.

References to "a wireless device" above include any group or subset of the wireless devices or even all of them.

Preferably, the controller is arranged to perform configuration of the wireless devices for at least interference measurement. That is, prior to processing the information based on interference measurements, the controller instructs the wireless devices as to the kinds of measurements it wishes to receive; this may include when, how, and how often each wireless device should report interference. How to report interference may include whether the reporting is to be threshold-based or periodic, on which frequencies and so forth. The configuration may be updated based on already-collected interference data (past history). For example, if the controller finds that a certain device begins to report significant levels of interference it may request more frequent reports from the device.

In addition, preferably, the controller is arranged to interrogate each wireless device about its capabilities for at least interference measurement. In this way, the controller is able to obtain more detailed interference reports from suitably-capable wireless devices.

The instructions from the controller may override certain instructions for interference mitigation internally generated within a single radio access network. This can be done in various ways. One possibility is for the controller to unconditionally replace the internally-generated instructions with its own instructions. Another possibility is that the controller's instructions replace the network's own interference-mitigation instructions in accordance with a preconfigured policy and/or when a predetermined threshold of interference is exceeded. Another possibility is that signalling takes place between the controller and that network to negotiate modification of the network's interference-mitigation strategy. That is, although each radio access network may individually take steps for mitigating interference within that specific radio access network, the controller is able to replace or modify such steps with its own instructions taking a coordinated approach between networks, if this would reduce interference within the system (the totality of all radio access networks in a given area) as a whole.

The information based on interference measurements, transmitted from the wireless devices, may take various forms. One form of the information simply indicates that interference measured by a wireless device exceeds a predetermined threshold. This form of information (which may correspond to an alarm signal) may be appropriate for relatively simple wireless devices of limited processing and/or battery power, such as MTC devices. More detailed interference reports may be transmitted by suitably-equipped wireless devices such as wireless handsets.

For example, the information based on interference measurements can indicate a change in measured interference since an earlier measurement, or an absolute measure of interference currently being experienced. Alternatively, the information may cover a period of time (or set of specific timings) since an earlier transmission.

According to a second aspect of the present invention, there is provided a controller for use in any wireless communication system as defined above. The controller may provide NREM capability in an application/services domain of the system.

According to a third aspect of the present invention, there is provided an interference mitigation method for use in wireless communication comprising:

at a controller common to a plurality of radio access networks, receiving information transmitted from a plurality of wireless devices over the plurality of radio access networks, including information based on interference measurements; and processing said information to attribute interference, measured by a said wireless device, to one or more other said wireless devices, and for generating one or more instructions to said wireless devices for mitigating said interference.

In the above method the controller may receive, in addition to the information from the plurality of wireless devices, information from other controllers, for example in the case of a service platform with distributed interference management.

The above method may contain steps corresponding to any of the optional features of the system as outlined above.

A further aspect provides software which, when executed by a processor, performs the method just defined. In other words the software implements one or more algorithms which cause the processor to act as the controller defined above. Such software may be stored on a computer-readable medium.

Thus, embodiments of the present invention can provide a method of interference mitigation control based on a controller (central controlling entity) which executes one or more algorithms for control of interference mitigation to devices capable of causing mutual interference based on both the device capabilities and configuration of interference measurements. The controller, residing in the application/service domain (above the traditional networking domain), potentially has knowledge of transmission and reception parameters and a number of additional parameters (such as battery status, support for MIMO, and so on) of a multitude of co-located wireless devices which may and often will operate using different radio access technologies (RATs). The controller employs this knowledge, not available to base stations/access points of individual RATs, to design system-level, environment aware adaptive interference mitigation mechanisms that rely on the fact that wireless devices can typically signal their capability to provide interference measurements as well as be able to be configured as to when and how often to report interference levels.

BRIEF DESCRIPTION OF THE DRAWINGS

Reference is made, by way of example only, to the accompanying drawings in which.

DETAILED DESCRIPTION

Before describing embodiments of the present invention, some further explanation will be given of interference scenarios and measures already under consideration for mitigation of interference.

In the following description, the term base station is used to denote the interface point between the radio interface used to connect a wireless device (e.g., MTC device) and the core network. This may or may not be a cellular base station as for example found in cellular standards such as GSM/UMTS/LTE.

Figure 1:
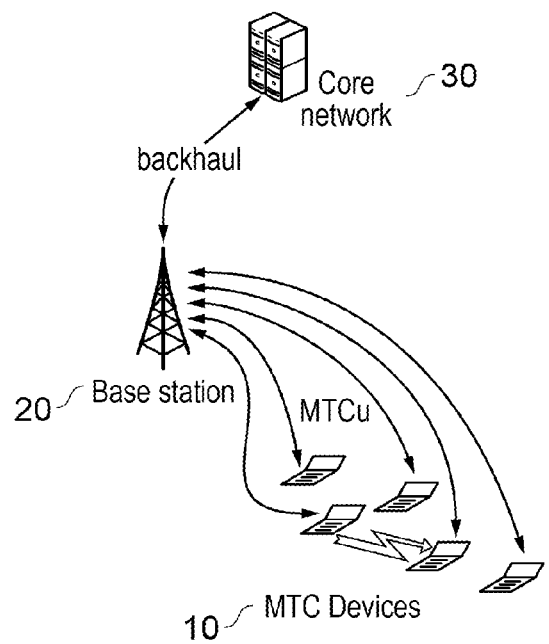
FIG. 1 shows interference between devices in wireless communication with the same base station (on the same or different frequency bands)

FIG. 1 schematically shows interference between a plurality of MTC devices 10 operating from the same base station 20 using the same or different frequency bands. The base station 20 communicates with a core network 30 via a backhaul (usually a wired connection).

In FIG. 1, MTCu denotes the radio interface that is used to send and receive information from the MTC devices 10. The interface labelled MTCu in the Figure represents any radio communication method that can be used by the device to connect to either a base station or gateway device. This base station or gateway device could be directly connected to the core network 30, or may use another radio interface to communicate with the core network 30. For example in IEEE 802.15.6, the gateway device may also be referred to as a "hub" or "coordinator".

Figure 2:
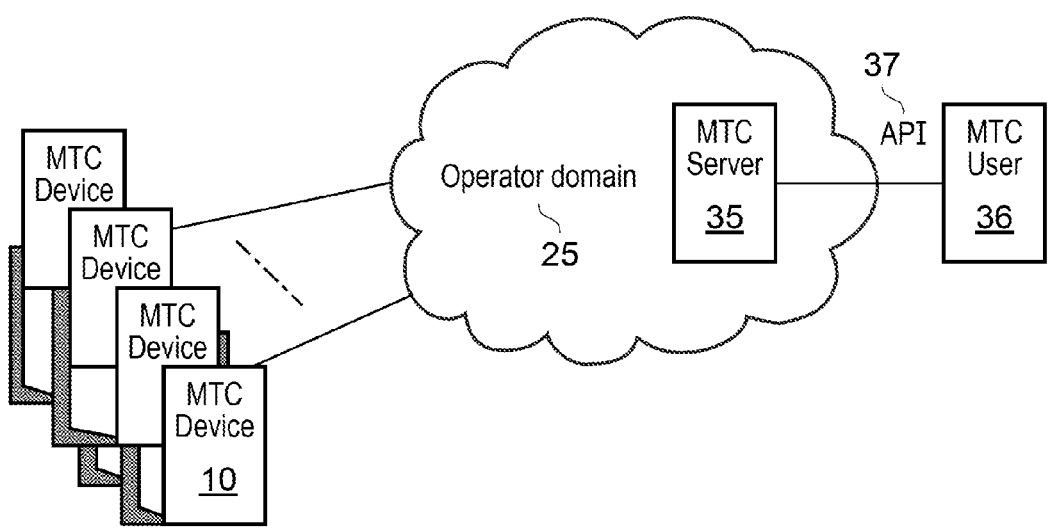
FIG. 2 shows a service layer architectural framework applicable to the scenario of FIG. 1.

Referring now to FIG. 2, this shows a service layer architectural framework of the same kind of system as FIG. 1. In the architecture proposed in 3GPP Technical Report TR 23.888, each MTC Device 10 connects to a 3GPP wireless communication network in an operator domain 25, via the MTCu interface. At the service layer, each MTC Device 10 is provided with services by an MTC Server within the core network. Thus, each MTC Device communicates with a MTC Server 35, which in turn is under control of an operator or MTC User 36. The MTC Server is an entity (service platform) which connects to the 3GPP network via an MTCi interface (for IMS) or a MTCsms interface (for SMS) and thus communicates with the MTC Devices. The MTC Server 35 may be an entity outside of the operator domain 25, or inside the operator domain.

In this scenario, there are known techniques for interference mitigation, including resource scheduling from the base station and the use of cancellation techniques.

Figure 3:
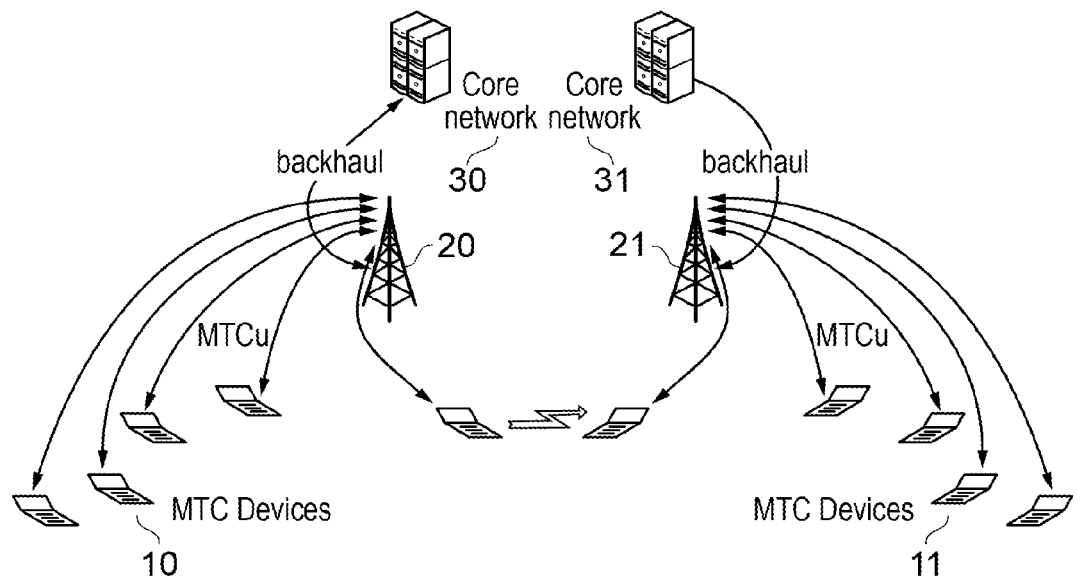
FIG. 3 shows interference between devices operating with different base stations, which base stations may employ different RATs.

FIG. 3 shows a scenario in which sets of MTC devices 10 and 11 operate from different base stations 20 and 21 respectively, each of the base stations being part of a different RAN and connected to a different core network 30 and 31 respectively. The different RANs may use the same RAT or different RATs.

The MTC devices 10 and 11 may be causing mutual interference to each other. Typically, in this type of scenario, interference mitigation can involve the exchange of information through the backhaul to the controlling base station for the devices affected (assuming that the respective core networks are linked), or can involve one device autonomously detecting interference and using conventional mitigation techniques to reduce this interference. Conventional interference mitigation techniques include scheduling based on interference measurement without attributing interference to any particular device or network.

The mitigation techniques used will mainly depend on whether the MTCu interface for the two sets of devices is the same radio access technology standard, closely related (perhaps using the same standard but operating in different frequency bands) or a different radio access technology (RAT). For the case of different radio standards, the exchange of information between MTC devices and the co-ordination of the radio resources to alleviate interference will be more complex.

Figure 4:
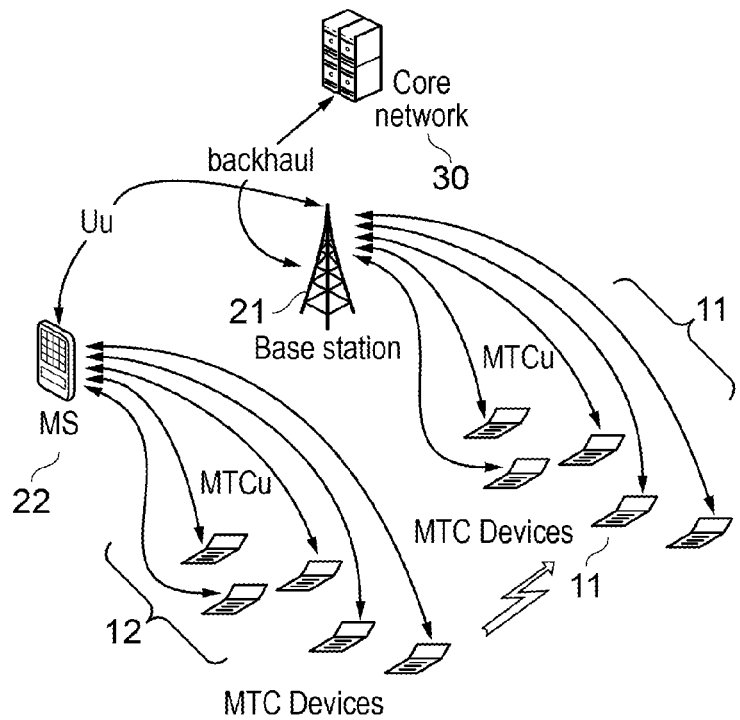
FIG. 4 shows Interference between devices operating using a mobile station as a gateway and directly connected devices.

In another possible scenario shown in FIG. 4, one set of MTC devices 12 is indirectly connected to the system, either through a gateway or as shown in the figure through a Mobile Station (MS) which in turn is linked to a base station 21. An example of the latter scenario would be a body-area network (BAN), where a user wears a plurality of MTC devices in the form of health monitoring sensors for example, and these are connected to the user's mobile phone for communicating with the wider system. Meanwhile, another set of devices 11 is connected to the system via the same or a different base station 21. In this scenario, usually different radio access technologies (RATs) will be employed for the different sets of MTC devices 11 and 12.

Interference mitigation in this scenario has not been properly addressed in the prior art. However, a technique worth mentioning is known from LTE and relates to heterogeneous networks having a mixture of Macro eNBs, Home eNBs and/or Pico eNBs defining multiple overlapping cells within a single RAT (namely LTE). An applicable technique for interference mitigation in heterogeneous networks is so-called inter-cell interference coordination (ICIC) as defined by 3GPP, and a recent development of this technique is called enhanced-ICIC or eICIC. For example, in LTE REL-10 Stage 2 (36.300), ICIC functionality is defined as follows: "Inter-Cell Interference Coordination (ICIC)

Inter-cell interference coordination has the task to manage radio resources such that inter-cell interference is kept under control. ICIC mechanism includes a frequency domain component and time domain component. ICIC is inherently a multi-cell RRM (Radio Resource Management) function that needs to take into account information (e.g. the resource usage status and traffic load situation) from multiple cells. The preferred ICIC method may be different in the uplink and downlink."

Frequency domain ICIC manages the radio resource blocks assigned to different devices in an effort to reduce interference. It is essentially a form of fractional frequency reuse (FFR) where different devices have different reuse factors applied to them depending on their SINR.

LTE Release 10 additionally introduces a form of co-ordinated muting of overlapping cells called time domain eICIC (TDM eICIC). Almost Blank Subframes (ABSs) are used to protect resources receiving strong inter-cell interference. The "Almost" refers to the fact that the muting is not complete: certain reference and synchronization signals continue to be transmitted even in the muted subframes. This technique requires synchronization between the cells involved.

Multicast Broadcast Multimedia Services (MBMS) are part of the LTE specifications, and one form of MBMS is called MBSFN or MBMS Single Frequency Network. Although originally intended for mobile television services, MBSFN subframes can be used for time-domain ICIC when they are also included in ABS patterns. The eNB cannot configure MBSFN subframes as ABSs when these MBSFN subframes are used for other usages (e.g., MBMS or location services (LCS)). ICIC is performed at the base station level (eNodeB in LTE).

ICIC is effective in the case where interference is caused by different radio systems in the same device; however, for radios in different devices co-ordination is usually much more difficult. Some studies have examined the problem of interference between different devices. 3GPP document R4-100706 "Coexistence studies between LTE and WLAN" gives some general analysis and interference mitigation schemes for LTE coexistence with WLAN. It concludes that the coexistence requirements for the most problematic cases, such as LTE UE and WLAN SS coexistence, may need to be addressed by specifying appropriate RF requirements for the LTE UE.

Meanwhile, in one of the access modes (beacon mode with beacon period) provided by IEEE 802.15.6, time is divided into superframes bounded by beacon periods of equal length. The hub or coordinator (corresponding to the base station shown in the Figures) performs Frame Control including selecting the boundaries of the beacon period, and thereby selecting allocation slots for its connected MTC devices. The hub may also transmit its beacon at different time offsets relative to the start of the beacon period. The standard defines a common MAC layer including fields for the above-mentioned Frame Control to identify the type of frame, set a security policy and specify the format of the frame payload. There are three distinct PHY layers, Narrowband (NB), Ultra Wideband (UWB) and Human Body Communications (HBC).

Interference mitigation schemes include the following coexistence mechanisms (all are optional):

1. Beacon Shifting

The hub transmits beacons with a varying time offset according to a particular beacon shifting sequence, not being used by any neighbouring hub.

2. Channel Hopping

The hub changes its operating channel according to a particular channel hopping sequence, not being used by any neighbouring hub. The MTC devices hop to the same channel to remain in communication with the hub.

3. Active Superframe Interleaving

This technique allows two Body Area Networks to share the same frequency resources. The two BANs co-ordinate their transmissions so as to transmit active superframes alternately in time.

Coexistence mechanisms are signalled using a "Fragment Number/Coexistence/Next" field in Frame Control (FC), in beacon frames sent by the hub:

1) The Beacon Shifting field is set to one if beacon shifting is currently enabled, or is set to zero otherwise
2) The Channel Hopping field is set to one if channel hopping is currently enabled, or is set to zero otherwise
3) The Inactive Superframe Starting field is set to one if one or more inactive superframes are enabled (starting) at the end of the current beacon period (superframe), or is set to zero otherwise.

The inventors have realised that if the geographically co-located devices all are using a common service platform to permit device configuration and control, then it may be possible to use this mechanism to allow better co-ordination of interference mitigation between the geographically co-located devices, using device management to avoid potential conflicts across diverse systems. The inventors have devised suitable algorithms to achieve this.

Figure 5:
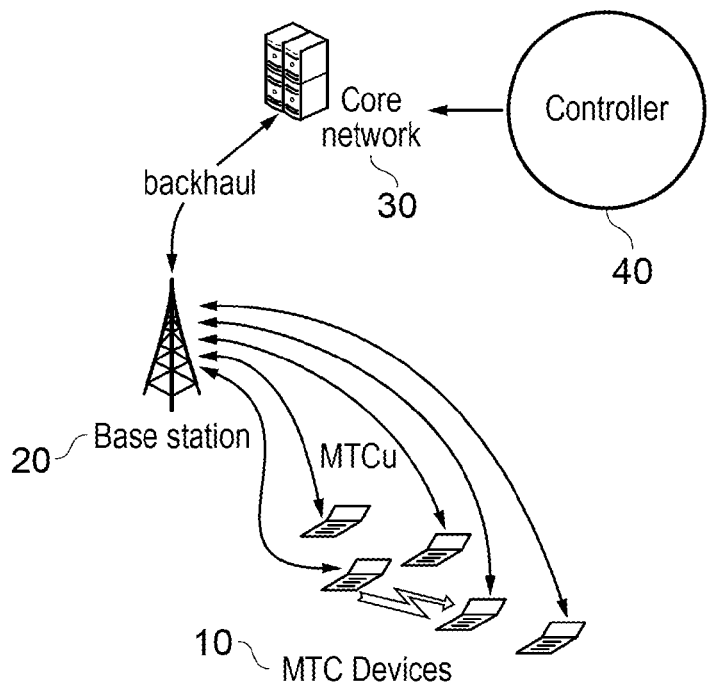
FIG. 5 shows a radio network architecture with MTC Devices, embodying the present invention.

An example of a radio network to which the present invention may be applied is shown in FIG. 5, which is closely similar to FIG. 1 except for provision of a controller 40. Several MTC devices are connected via the radio interface MTCu to a base station that is connected to a core network. The user data, as well as other data (see below) for the MTC devices is routed to the controller 40, which may be in the form of an MTC server. In the case of 3GPP, for example, this would be usually via a Serving GPRS Support Node (SGSN) and a Gateway GPRS Support Note (GGSN) in a GPRS Core Network.

Briefly outlined, an embodiment of the present invention involves the following considerations.

The exchange of key interference measurement parameters is used to enable more efficient dynamic interference management. The interference measurement may depend on the capabilities of the device. For example, very simple devices may provide no measurement of interfering signals, whilst devices with more sophisticated capabilities may be capable of providing a detailed measurement report, which can identify the exact source of any interfering signals.

Typically devices which operate in the same location as other devices may or may not be suffering a degraded performance as a result of nearby devices causing interference.

The controller 40 (also called central unit or central entity) performs interference reduction processing as required using one or more algorithms designed to meet certain interference reduction criteria. Details of the proposed algorithms and actions undertaken by mutually-interfering wireless devices as a result of the processing in the controller are described later. A number of embodiments will describe how a system based on this invention can be implemented.

The ability to configure the measurement of interference from devices with this capability can allow the operation of more sophisticated central control of possible interference mitigation techniques such as the control of transmission signal power or the transmission signal frequency, and may potentially override existing interference mitigation procedures performed within a single radio access network.

MTC is a specific use case for the present invention, and the following description will refer to MTC devices by way of example only. Embodiments of the present invention provide a new method for the mitigation of interference between MTC devices which may typically operate on different radio access technologies, taking advantage of the following features:

1. MTC devices are assumed in the present invention to be capable of both:
   a) signalling an interference measurement capability; and
   b) configurable in their measurement capability to allow triggered reports of interference as alarms, or according to a configured schedule.
2. Central co-ordination of the interference measurement ability by a controller can result in an interference mitigation strategy which can be applied to MTC devices operating in different radio access networks.

In outline, embodiments of the present invention employ the mechanism detailed in the flowcharts shown in FIGS. 6 and 7 below.

Figure 6:
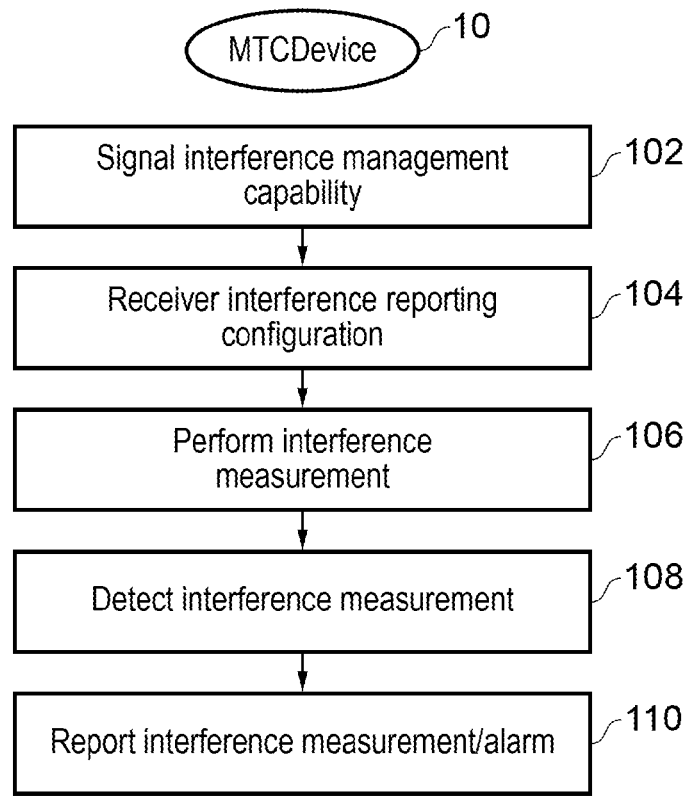
FIG. 6 is a simplified flowchart of steps taken at a wireless device for interference mitigation in an embodiment of the present invention.

FIG. 6 illustrates the flowchart corresponding to behaviour of an MTC device 10. At 102, an initial step of capability management is made where the MTC device either indicates, or is requested to provide, its interference management capability. This capability consists of the device's ability to make interference related measurements, to detect (in other words to analyze and not merely measure) interference caused by other devices, reporting configuration, alarm notification and/or ability to perform a specific mitigation technique to alleviate interference from other devices.

The next step 104 involves the controller 40, via the network, configuring the device having the required capability to perform interference measurements. This can include a timing and/or periodicity of measurements and criteria for reporting interference so measured. The configuration may be threshold-based, periodic, scheduled on certain frequencies, and so on. The configuration may be updated based on already-collected interference data, in other words, past history of the device's interference. For example, an increased frequency of interference reporting may be configured for a device which has started to experience interference.

Then, during normal operation of the network, the wireless device measures interference (step 106), detects the interference (108) according to the configuration set by the controller, e.g. by detecting that the interference exceeds a predetermined threshold, and reports either the interference measurements according to a configured schedule or an interference detection alarm (step 110).

In addition to interference information, the wireless device transmits other information to the network which can assist the controller in identifying specific wireless devices. This information can include frequency and time transmission patterns, traffic type (periodic or "bursty", and packet size), and spatial signatures being used by the device.

This is in addition to the wireless device's normal operation which will generally involve transmitting sensor data to the network. Where the controller is also an MTC server, the sensor data too is routed to the controller.

As a further step (not shown), the wireless device may receive from the controller instructions for adjusting its reporting configuration and/or for the purposes of interference mitigation as described later.

Although the above description refers to an MTC device 10 by way of example, it should be noted that other kinds of wireless device can equally be configured for interference reports in a like manner. Such other types of device include intermediate nodes in the network, including relay stations or a base station.

Figure 7:
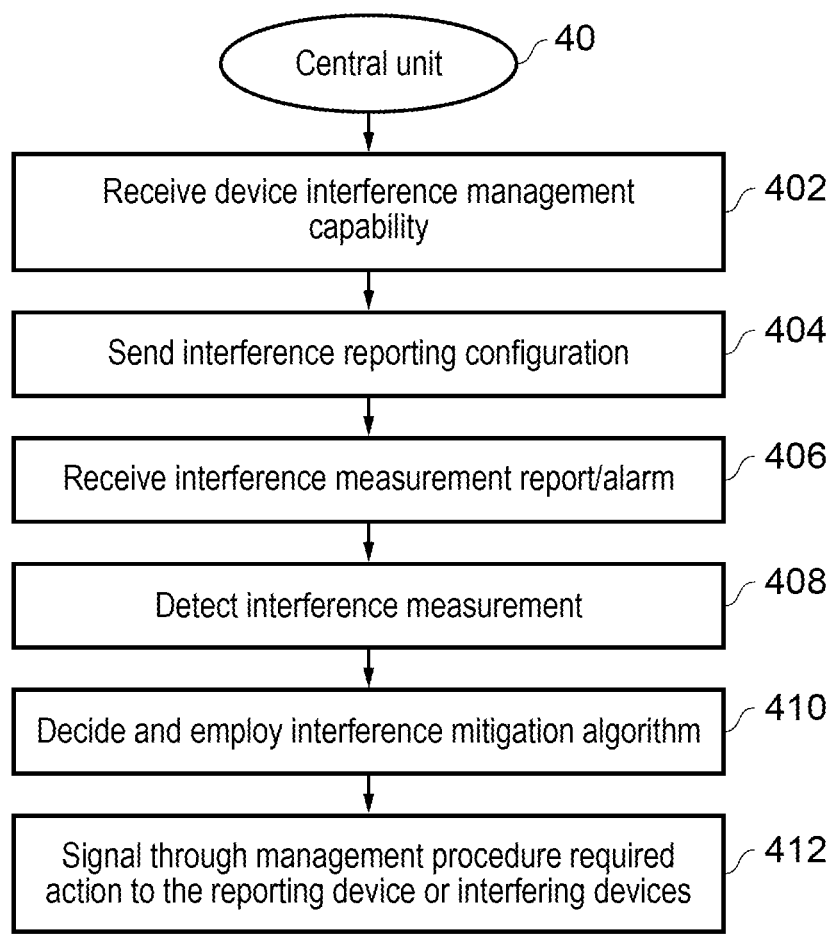
FIG. 7 is a flowchart of steps taken at a central unit (controller) for interference mitigation in an embodiment of the present invention.

FIG. 7 is a flowchart for operation of the controller (here called central unit) 40. The initial step 402 is for the central unit to obtain device capabilities to determine which devices have the capability of interference management. Then (step 404) the central unit 40 sends an interference reporting configuration to each wireless device or set of devices having the required capability, to configure the devices to send their interference measurements according to a configured schedule or to send an alarm when measured interference exceeds a predetermined threshold. Subsequently (step 406) the central unit 40 receives the information reported from the devices 10 and detects the same (408). The detected interference measurements are used in algorithms that provide the optimum strategy for the interference mitigation (step 410). The outcome of the algorithms can be signalled to the devices by device management techniques (step 412).

Novel algorithms for interference mitigation are detailed below together with the resulting device behaviour, and can employ known techniques (e.g. ETSI-standardised techniques) for device management and communication. The control of the mitigation does not necessarily have to be in real time, but can be performed as a longer term management of the interference mitigation, typically in the order of minutes rather than msec.

The device members of an MTC group may change due to, for example, some devices switching off for power saving, or simply moving out of the geographical area under consideration. In this event, the updates of the interference related information, possibly along with other updates such as change of transmission parameters and traffic type, need to be communicated between the MTC devices and the base station, thus ensuring that only the minimum overhead is required in order to schedule the data transmission of the devices of an MTC group on MTCu interface.

Figure 8:
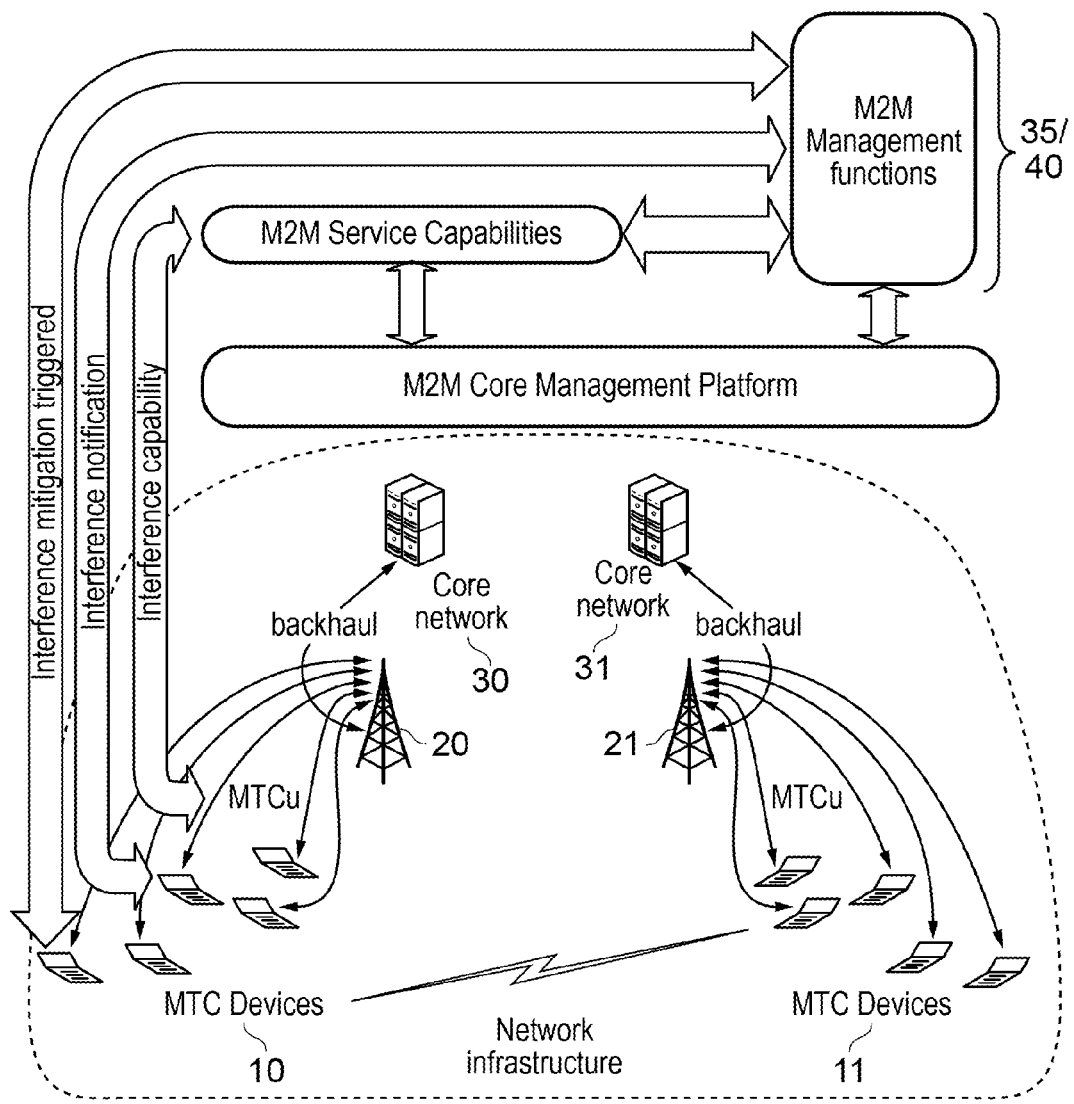
FIG. 8 shows an architectural framework applicable to an embodiment of the present invention.

FIG. 8 depicts an example architecture for M2M interference management on an M2M enabled radio interface for M2M devices in different MTC groups 10 and 11. Network infrastructure, indicated within the dotted line, is shown in the form of two radio access networks having respective MTC device groups. As shown, MTC device group 10 is associated with a first base station 20, connected via a backhaul to a first core network 30; whilst a second device group 11 is connected wirelessly to a second base station 21 which has a backhaul connection to a second core network 31. Outside the dotted line in FIG. 8, an application/services domain is conceptually shown. An M2M Core Management Platform, M2M Service Capabilities, and M2M Management Functions correspond to the above-mentioned central unit 40 and MTC server 35.

As already mentioned, a method embodying the present invention involves the following steps:
 1. MTC devices (and/or other wireless devices, such as a relay station or base station connected to MTC devices) with an interference measuring capability are identified by exchange of capability signalling information.
 2. A device capable of performing interference measurement is configured to start to perform interference reporting based on configurable thresholds which can be based for example on the devices own capabilities and/or capabilities of known devices in the same vicinity as the device (more examples given below).
 3. When a device detects interference, it can communicate this information using threshold triggered reporting and/or as a report which is performed with a known periodicity.
 4. A central MTC management function is then used to trigger the appropriate interference mitigation method (to the device that measured the interference and/or to devices in the same physical location as the device) in order to alleviate the resulting radio interference. Proposed interference mitigation methods are described below.

The role of the controller, i.e. the control of the interference measurements and the overall control of inter-device interference can be performed in an M2M Management function control centre, which is able to manage the capabilities of MTC devices irrespective of the underlying connection to the core network. The M2M Core Management Platform interfaces with the Core Networks through a set of exposed interfaces (interfaces specified in prior art, such as 3GPP).

In the existing ETSI implementation of the functional architecture for M2M communication (the document ETSI TS102 690 10.11.2 is hereby incorporated by reference), the interference control policy and algorithms described in this invention can be performed using the Network Remote Entity Management (NREM) capability [Section 5.2.5 ibid], which is one of the ETSI M2M Service Capabilities comprising the ETSI M2M core [Figure 4.1 ibid]. In other words, the central unit/controller referred to previously may take the form of an NREM, and this may reside in the M2M Service Capabilities layer shown in FIG. 8. The MTC server 35 shown in FIG. 2 may also be provided by the M2M Service Capabilities Layer.

One of the key tasks of the ETSI NREM capability is precisely to collect and store information such as radio interference management data on behalf of M2M Applications or Management Functions, and to provide such information to M2M Applications and Management Functions. However, NREM as presently specified does not cover what use is made of interference data.

Due to the cyclic nature of M2M communications which may be adjusted in some cases or allocated in mutually exclusive time cycles, multiple time cycles of device behaviour (and consequently of interference) may arise in the system. For example there may be short term TDM type time cycles (there may be N groups separated in time, in a manner similar to paging groups). There may also be longer time cycles such as 24 hrs or 7 days×24 hrs. In the present invention, the central unit/NREM may take account of such patterns by performing management based on pre-determined (forecasted or scheduled) time cycles. The schedule can change dynamically based on local interactions and settings arising from environment or human interactions with the applications (for example by the MTC User 36, operating the MTC Server 35 of FIG. 2 via an API).

I.

Figure 9:
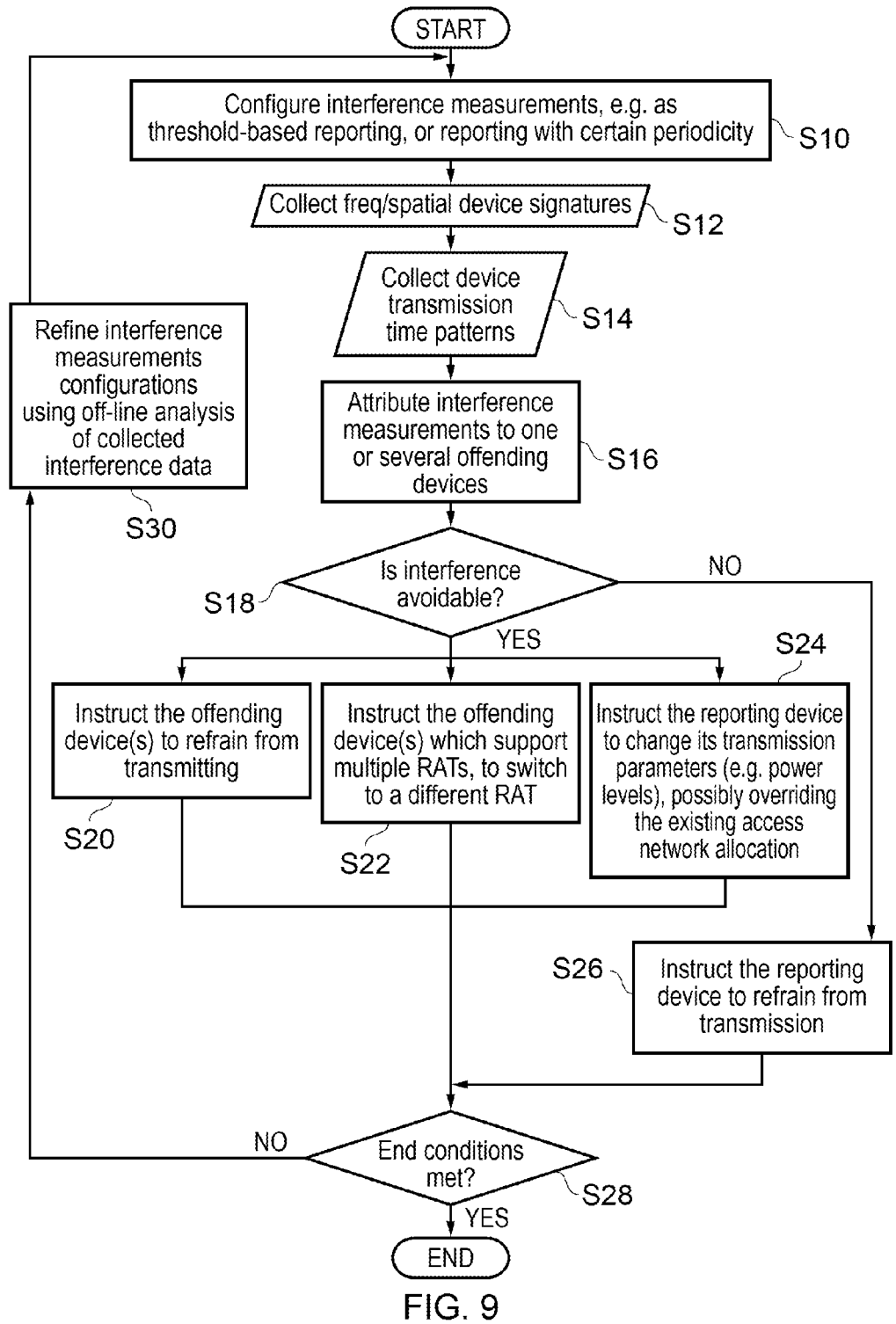
FIG. 9 is a more detailed flowchart of a method embodying the present invention.

FIG. 9 is another flowchart of the operation, which may be regarded as a more detailed version of FIG. 7.

In step S10, the controller (or MTC management function, NREM etc.) configures the wireless devices for performing interference measurements as already mentioned. In steps S12 and S14, the controller collects information on the characteristics of transmissions from each wireless device, in addition to collecting the interference measurements described earlier. This allows the controller to identify the likely sources of interference. In step S16, the controller, having knowledge of the location/RAT of potentially interfering devices, processes the interference measurements from a wireless device so as to attribute them to one or several of the interfering devices in the vicinity of the reporting device. The successful identification of the offending devices can be done based on:
 The known transmission parameters (frequency/spatial signature) of the devices
 The known transmission time patterns (such as burstiness, or periodicity) of the devices If the controller determines that the interference is avoidable (can be reduced) in step S18, it then takes one or more of the following actions:

The controller instructs the offending device(s) to refrain from transmitting (perhaps temporarily)—step S20;

The controller instructs the offending device(s) which support multiple RATs, to switch to a different RAT—step S22.

The controller instructs the reporting device to change its transmission parameters (e.g. power levels), possibly overriding the existing access network allocation—step S24.

If the controller determines that the interference cannot be avoided, it may instruct the reporting device (i.e. the one experiencing the interference) to refrain from transmission in step S26. This may be appropriate when the central device has knowledge of imminent and unavoidable interference (e.g. if there is a large number of MTC devices sending data fairly frequently and regularly—an example would be smart meters—with well-known usage pattern of radio resources).

Then the controller assesses (S28) whether or not end conditions on interference, allowing the method to be suspended, have been met. If yes, the process is ended for the geographical area being treated. Of course, a similar process may have to be carried out for a number of other geographical areas controlled by the same controller. If the end conditions are not met, the controller returns to the start after an optional feature (step S30) of instructing a wireless device how (on which frequency/time/spreading code resource) to perform interference measurements, based on the knowledge of other wireless devices operating in its vicinity. This knowledge can for example be obtained by "data mining" or other off-line data analysis techniques on the collected interference measurement data.

In another embodiment of the present invention, the controller can assist in the simultaneous scheduling of only those devices that have the potential to mitigate interference. This can be based e.g. on whether the devices have multiple antennas, allowing beam-shaping or zero-forcing techniques. Alternatively, the controller can decide to stop requesting interference reports from certain devices based e.g. on their battery status (since if battery level is low, any non-essential signal processing should be eliminated).

To facilitate implementation of, and user interaction with, the controller, a device management procedure can be used, for example:

ETSI OMA RESTful bindings for Parlay X Web Services—DeviceCapabilities, Candidate Version 1.0-11 Jan. 2011, Open Mobile Alliance.

Parlay provides a network API (Application Programming Interface) which enables telecommunications services to be developed without the developer having to know the details of the particular telecommunications protocols being used. Parlay X supplies a Web interface to simplify development even further. REST stands for REpresentational State Transfer and refers to a client-server architecture used for Web services, "RESTful" denoting conformity to REST constraints.

Version 1.0 of DeviceCapabilities ParlayREST API specification supports the following operations:

Get device capabilities

Create a subscription for device capabilities change notifications (for a single device or a group of devices)

Send a notification on device capabilities changes to a subscribed application

Set device configuration (for a single device or a group of devices)

Get available configurations for a given device model

Get configuration history for a given device

Adoption of the above procedure allows the wireless devices to be interrogated and controlled without requiring detailed knowledge of the radio access networks in use, and provides a user-friendly interface for a human operator.

Various modifications are possible within the scope of the present invention.

Although the above embodiments have referred to MTC devices, the present invention is not necessarily exclusively for use with MTC devices. It may find application whenever a large number of wireless devices are physically co-located (in other words, located in the same geographical area) and use more than one radio access network to connect to a wider system. As already mentioned, other kinds of wireless device may be involved in the procedure by being configured for measuring, and providing, interference information. Such other kinds of device include a relay station or base station for example.

Although the above description has referred to a "central unit" and "controller", it is not essential for the controlling entity to be a single unit. If several M2M management functions control centres are used (in the overall M2M system), then there is a need for cross communications between these control centres. This can be achieved by the open transfer of information of the device capability management functions from one M2M manager to another (as long as appropriate authentication and security procedures have been performed). In this way the controller effectively becomes a distributed control for interference mitigation.

II.

To summarise, this invention proposes an interference mitigation scheme primarily intended for MTC devices which may be using different access networks but which share a common service platform. In this scheme, a wireless device such as an MTC device can either sense radio interference and then signal an alarm and/or operate one of many possible radio interference mitigation techniques, as part of central algorithms in response to alarms from other devices.

If the geographically co-located devices all are using a common service platform, and a device capable of performing interference measurements is configured to perform interference reporting based on configurable thresholds which can be based for example on the device's own capabilities and/or capabilities of known devices in the same vicinity as the device, a central unit (central MTC management function) may operate algorithms which then trigger appropriate interference mitigation methods. The centralised algorithms proposed have the potential for more efficient solutions than existing inter-RAT interference mitigation solutions. For instance, in a preferred embodiment the central unit can pinpoint devices that are causing interference to a certain MTC device based on this device's reported interference patterns and its own knowledge of surrounding MTC devices' characteristics, and take appropriate actions to mitigate this interference.

The control of the interference mitigation gives an additional stability mechanism for existing interference and co-existence schemes, by using device management information exchange and avoiding potential conflicts across diverse systems.

As already mentioned, IEEE 802.15.6 proposes co-existence mechanisms including beacon shifting, channel hopping, and active superframe interleaving. However, these mechanisms are generally "in-device" or non-radio access specific, and do not operate based on a shared service platform which attributes interference to specific users. For all the above optional co-existence mechanisms, the present invention adds a measure of configuration and control based on the capability of devices to perform interference measurements.

INDUSTRIAL APPLICABILITY

This invention proposes a mechanism to reduce the problem of radio interference between MTC devices. In addition to well-known benefits of successful interference mechanisms, which include efficient use of radio resources, and allowing MTC devices that are co-located with other MTC devices to operate without mutual interference problems, the present invention introduces an additional novel stability mechanism for existing interference mitigation and co-existence schemes by using device management and avoiding potential conflicts across diverse systems. Under the assumption that geographically co-located devices are all using a common service platform (or an common interference "broker"), the centralised algorithms proposed here have the potential for more efficient solutions than existing interference mitigation solutions.

The invention claimed is:

1. A wireless communication system having a plurality of radio access networks and comprising:
a plurality of wireless devices each operable to perform wireless communication via at least one of the radio access networks; and
a controller arranged to receive information, including information based on radio interference measurements, transmitted from the wireless devices over the plurality of radio access networks; wherein
the controller includes a processor arranged to process said information to attribute radio interference, measured by a said wireless device, to one or more other said wireless devices, and to generate one or more instructions to said wireless devices for mitigating said interference.

2. The wireless communication system according to claim 1 wherein the information received by the controller includes information on device signatures and transmission patterns of the wireless devices.

3. The wireless communication system according to claim 1 wherein the instructions include at least one of: instructions to said other wireless devices to which the interference is attributed; and instructions to said wireless device which measured the interference.

4. The wireless communication system according to claim 1 wherein the instructions include an instruction to a wireless device to refrain from transmitting within a defined time period and/or on a defined frequency and/or in a specific spatial direction.

5. The wireless communication system according to claim 1 wherein the instructions include an instruction to a wireless device to perform wireless communication using a different radio access network.

6. The wireless communication system according to claim 4 wherein the instructions include an instruction to said wireless device to change one or more transmission parameters of its wireless communication, such as transmission power, transmission frequency, modulation and coding scheme, retransmission parameters, spatial coding.

7. The wireless communication system according to claim 1 wherein the controller is arranged to perform configuration of the wireless devices for at least interference measurement.

8. The wireless communication system according to claim 7 wherein said configuration includes when, how, and how often each wireless device should report interference.

9. The wireless communication system according to claim 7 wherein the controller is arranged to interrogate each wireless device about its capabilities for at least interference measurement.

10. The wireless communication system according to claim 1 wherein said instructions override certain instructions for interference mitigation generated within a single said radio access network.

11. The wireless communication system according to claim 1 wherein the information based on interference measurements indicates at least one of: that interference measured by a wireless device exceeds a predetermined threshold; and a change in measured interference since an earlier measurement.

12. The wireless communication system according to claim 1 wherein the wireless devices include machine-type communication devices and the controller provides network remote entity management capability in an application/services domain.

13. A controller for use in the wireless communication system of claim 1.

14. An interference mitigation method for use in wireless communication comprising:
at a controller common to a plurality of radio access networks, receiving information transmitted from a plurality of wireless devices over the plurality of radio access networks, including information based on radio interference measurements; and
processing said information to attribute radio interference, measured by a said wireless device, to one or more other said wireless devices, and for generating one or more instructions to said wireless devices for mitigating said interference.

15. One or more non-transitive computer-readable recording media on which is recorded software which, when executed by a processor, performs the method according to claim 14.

* * * * *